United States Patent [19]

de Baan et al.

[11] Patent Number: 4,494,632
[45] Date of Patent: Jan. 22, 1985

[54] PISTON GUIDE AND SEAL FOR DUAL-TUBE HYDROPNEUMATIC SHOCK ABSORBER

[75] Inventors: Johannes J. de Baan; Michael Hönig, both of Ennepetal, Fed. Rep. of Germany

[73] Assignee: August Bilstein GmbH & Co. KG, Ennepetal-Altenvoerde, Fed. Rep. of Germany

[21] Appl. No.: 477,816

[22] Filed: Mar. 22, 1983

[30] Foreign Application Priority Data

Mar. 23, 1982 [DE] Fed. Rep. of Germany ....... 3210518

[51] Int. Cl.³ .................. F16F 9/36; B60G 15/00
[52] U.S. Cl. .................. 188/269; 188/322.14; 188/322.17
[58] Field of Search ............ 188/322.17, 322.16, 188/322.14, 318, 315, 269; 277/25, 237 A, 152, 153, 179, 189, 33

[56] References Cited

U.S. PATENT DOCUMENTS

| 4,290,511 | 9/1981 | de Baan et al. | 188/322.16 |
| 4,438,834 | 3/1984 | Handke et al. | 188/322.17 |
| 4,445,598 | 5/1984 | Brambilla | 188/315 |

FOREIGN PATENT DOCUMENTS 7619540 11/1976 Fed. Rep. of Germany .
2912902 11/1982 Fed. Rep. of Germany .

Primary Examiner—Bruce H. Stoner, Jr.
Assistant Examiner—Alvin Oberley
Attorney, Agent, or Firm—Karl F. Ross

[57] ABSTRACT

A hydropneumatic shock absorber has an outer tube, an inner tube inside the outer tube, forming therewith an outer gas/liquid chamber and itself internally forming an inner chamber and a piston rod inside the inner tube. A body of liquid fills the entire inner chamber and partially fills the outer chamber. A piston on the rod subdivides the inner chamber into an upper and a lower compartment. A foot valve is located at the lower tube ends. A rigid centering washer has an outer periphery engaged against the upper end of the outer tube and an axially extending ridge engaged directly radially against the upper end of the inner tube. A flexible annular outer lip on the washer engages radially against the upper end of the inner tube to bear flexibly to permit limited fluid flow from the upper compartment to the outer chamber while blocking opposite flow. A flexible annular inner seal underneath the ridge on the washer engages radially inwardly against the piston rod. An outer seal on the washer engages against the outer tube so the washer and outer seal upwardly close off the outer chamber. An upwardly open pocket down into which the inner seal projects is provided in the inner tube at its upper end. A passage extends from the inner chamber past the pocket so that gas collecting in the inner chamber can bleed up past the pocket and then pass by the lip into the outer chamber.

11 Claims, 3 Drawing Figures

PISTON GUIDE AND SEAL FOR DUAL-TUBE HYDROPNEUMATIC SHOCK ABSORBER

FIELD OF THE INVENTION

The present invention relates to a dual-tube hydropneumatic shock absorber. More particularly this invention concerns a seal and guide arrangement for the piston rod of such a device.

BACKGROUND OF THE INVENTION

Two-tube shock absorbers are known, as for example from my copending U.S. patent application Ser. No. 323,890 filed Nov. 23 1981, now U.S. Pat. No. 4,428,566 and from my earlier U.S. Pat. No. 3,749,210 as well as from U.S Pat. Nos. 2,943,711, 3,661,236, and 4,005,769, German patent document No. 2,912,902, and German utility model No. 7,619,540. A standard such shock absorber has an outer tube centered on an upright axis and forming with an inner tube an outer gas/liquid chamber. A piston rod inside the inner tube forms therewith an inner liquid chamber that can be pressurized by axial displacement of this piston rod and of the piston attached to it that rides on the inner wall of the inner tube. A foot valve allows limited flow between the inner and outer chambers. The inner chamber is completely filled with liquid, and the outer chamber is partially filled with this liquid and has a pressurized head of air above the liquid.

Normally the piston rod passes out of the absorber through a guide-seal assembly that incorporates at least one hard synthetic-resin guide bushing and inner and outer soft seal rings that axially flank this bushing. The inner seal protects the outer seal against the high pressure reigning in the inner chamber as the piston moves axially up. The guide-seal assembly is formed with a passage communicating between a compartment formed between the inner and outer seals and the outer chamber. A check valve in the guide-seal assembly permits flow from the inner chamber to the outer chamber for bleeding air from the inner chamber.

The inner seal in an arrangement such as described in above-cited German utility model No. 7,619,540 is spaced axially down from the guide bushing, normally being provided in a further inner tube extending down from the guide-seal assembly. This inner seal normally lies below the liquid level in the outer chamber. As some lateral bending of the piston rod is common, this inner seal and the elements carrying it must normally be built to permit limited radial shifting. Such construction not only leads to premature wear for this inner seal, which must be able to resist high pressure, but also makes lubrication of the guide bushing and outer seal difficult.

In my copending U.S. patent application Ser. No. 323,890 filed Nov. 23, 1981, now U.S. Pat. No. 4,428,566, I describe a hydropneumatic shock absorber comprising, as is known in the art, an outer tube centered on an upright axis, an inner tube coaxially spaced inside the outer tube and forming therewith an outer gas/liquid chamber, a piston rod inside the inner tube, generally coaxial with the tubes, and forming with the inner tube an inner liquid chamber, and a piston carried on the rod and radially outwardly engaging the inner tube, whereby axial displacement of the piston and rod relative to the tubes in one direction pressurizes the inner chamber. A foot valve between the inner and outer chambers permits limited liquid flow therebetween. A body of liquid fills the inner chamber and partially fills the outer chamber. An annular plug is fixed at the upper axial ends of the tubes and axially upwardly blocks the inner and outer chambers. A guide bushing in the plug surrounds the piston rod and an annular outer seal in the plug surrounds the piston rod above the bushing and forms with the bushing and plug an annular compartment surrounding the rod. According to this invention, the plug is formed with an inner passage having one end opening into the compartment and another end opening into the inner chamber and with an outer passage having one end opening into the compartment and another end opening into the outer chamber. A porous body is provided in the inner passage and a check valve in the outer passage permits flow only from the compartment into the outer chamber. An annular inner seal in the plug and surrounds the piston rod immediately below the bushing.

With this arrangement the compartment is always filled with oil, so that the outer seal as well as the guide bushing are continuously lubricated, thereby improving the sealing performance of the outer seal as well as the guiding performance of the bushing. Since the inner seal is directly beneath the guide bushing in the plug assembly it need not be set up to compensate for lateral bending or other displacement of the piston rod. Furthermore since the inner seal is not axially shiftable so it can act as a check valve it can seal much more tightly at the high pressures it will be exposed to.

In order to keep the seal of the known systems lubricated it must be provided relatively low in the structure. This necessitates the use of a relatively long and expensive seal and guiding arrangement.

OBJECTS OF THE INVENTION

It is therefore an object of the present invention to provide an improved dual-tube hydropneumatic shock absorber.

Another object is the provision of such a dual-tube hydropneumatic shock absorber which overcomes the above-given disadvantages, that is which is simple and inexpensive in construction and which operates surely over a long service life.

A further object is to advance the principles of the invention of the above-discussed earlier patent application.

SUMMARY OF THE INVENTION

These objects are attained according to the instant invention in a hydropneumatic shock absorber having, as is known, an outer tube having upper and lower ends and centered on an upright axis, an inner tube inside the outer tube, forming therewith an outer gas/liquid chamber, having upper and lower ends, and itself internally forming an inner chamber and a piston rod inside the inner tube in the inner chamber and generally coaxial with the tubes. A body of liquid fills the entire inner chamber and partially fills the outer chamber. A piston carried in the inner chamber on the rod radially outwardly engages the inner tube, and subdivides the inner chamber into an upper and a lower compartment. A foot valve at the lower ends between the lower compartment and outer chamber permits limited liquid flow therebetween. A rigid centering washer has an outer periphery engaged against the upper end of the outer tube and an axially extending ridge engaged directly radially against the upper end of the inner tube. A flexible annular outer lip on the washer engages radially against the upper end of the inner tube to bear flexibly thereagainst in a direction opposite the direction in which pressure in the upper compartment is effective against the outer lip. Thus the outer lip acts as a check valve to permit limited fluid flow from the upper compartment to the outer chamber while blocking opposite flow. A flexible annular inner seal underneath the ridge on the washer engages radially inwardly against the piston rod. Thus the washer and inner seal upwardly close off the inner chamber. An outer seal on the washer engages against the outer tube. Thus the washer and outer seal upwardly close off the outer chamber. An element forms in the inner chamber an upwardly open pocket down into which the inner seal projects. Structure forms a passage from the inner chamber axially past the pocket. Thus gas collecting in the inner chamber below the pocket can bleed up past the pocket and then pass by the lip into the outer chamber.

With this system the entire guiding and sealing arrangement is constituted as an axially short unit that is carried on the centering washer. The inner seal projects axially far enough down into the oil-filled pocket that it is kept wet for best sealing and longest service life. Furthermore bleeding of air out of the upper compartment takes place without having to provide bores in the inner tube or in the plug.

According to this invention the washer is of L-section and has an elastomeric coating forming the seals and lip. Thus the unit is very simple and inexpensive to manufacture. In addition the washer and ridge are formed with at least one groove forming part of the bleed passage. The ridge according to this invention can lie inside the upper end of the inner tube and radially outwardly engage same, or it can lie outside the upper end of the inner tube and radially inwardly engage same.

The upper end of the inner tube has a widened uppermost region and the element is a funnel lining forming the pocket and defining with the widened uppermost end a part of the passage. In addition the funnel lining has an upper edge projecting axially above the inner seal. Such construction is extremely simple and keeps the gas away from the inner seal. The gas is conducted to the check-valve outer lip so that it does not form a head or cushion at the top of the upper compartment underneath the inner seal.

In accordance with another feature of the invention the inner tube is provided below the washer, lip, seals, and pocket with a rigid piston guide ring snugly engaging the piston rod and inner tube and having an outer surface formed with an axial groove constituting part of the passage and a high-pressure rod seal snugly engaging the piston rod and inner tube beneath the guide ring and having an outer surface formed with an axial groove constituting part of the passage. A lower retaining ring is snugly fitted in the inner tube immediately below the rod seal and slightly axially spaced below same. Thus the rod seal has limited axial play between the guide and retaining rings.

The inner seal according to the invention is formed as an inner lip bearing flexibly and radially inwardly against the piston rod and extending axially down from the washer. A spring can be looped around the inner lip to urge same against the piston rod for tightest possible seal at this location.

DESCRIPTION OF THE DRAWING

The above and other features and advantages will become more readily apparent from the following, reference being made to the accompanying drawing in which.

SPECIFIC DESCRIPTION

Figure 1:
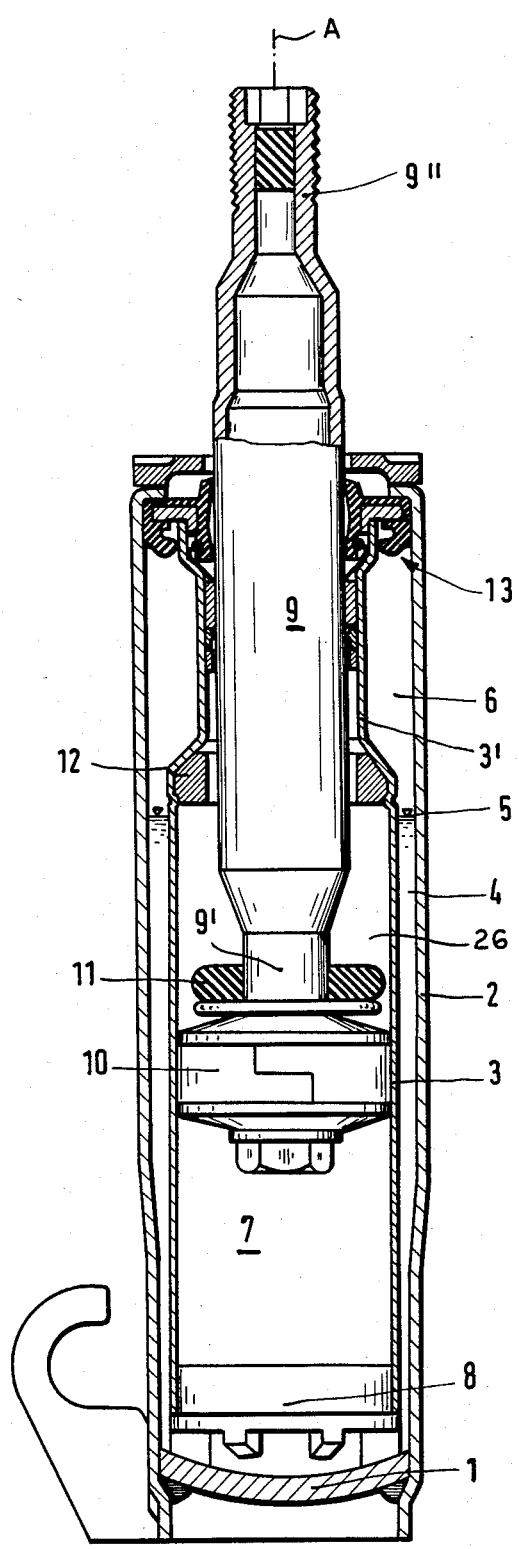
FIG. 1 is an axial section through a two-tube front-wheel shock absorber according to the invention.

FIG. 1 shows a shock absorber centered on an axis A and having an outer tube 2 sealed at its lower end by a plate 1 and defining with an inner tube 3 an outer chamber 4 filled below a level 5 with a liquid, here oil, and having thereabove an air head 6. A piston 10 radially outwardly engaging the inner wall of the inner tube 3 subdivides the chamber formed by its interior into a lower compartment 7 and an upper compartment 26. The lower compartment 7 communicates limitedly through a foot valve 8 with the chamber 4. The upper compartment 26 is annular and surrounds the piston rod 9 which extends axially upward out of the assembly. The upper end 9" of this rod 9 is secured to the vehicle frame and the tubes 2 and 3 to a suspension part such as a wheel A-frame. The head 6 is at a pressure of about 5atm.

An annular elastomeric bumper 11 fits snugly around the small-diameter lower end 9' of the piston rod 9 and lies axially on top of the piston 10, which is formed as is known with flapper valves and throughgoing passages as described in our above-cited copending application. This bumper 11 can engage axially up against the bottom face of a ring 12 lodged in the tube 3 at the neck defined at the bottom of a small-diameter upper portion 3' of this tube 3. A seal/guide assembly 13 closes off the upper ends of the outer chamber 4 and the inner compartment 26 around the piston rod 9.

Figure 2:
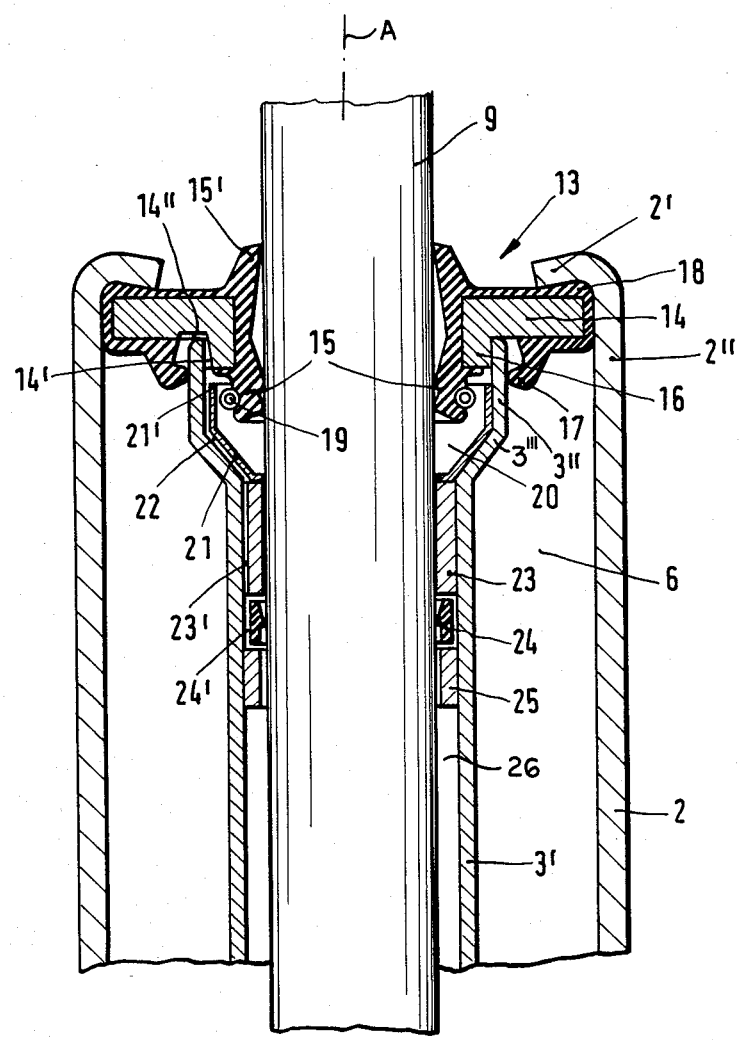
FIG. 2 is a large-scale view of a detail of FIG. 1.

As best seen in FIG. 2 the inner tube 3 has above its small-diameter upper portion 3' an intermediate-diameter portion 3" to which it is joined by a frustoconical portion 3''', all centered on the axis A. The assembly 13 has an L-section washer 14 with an axially downwardly projecting lip or rim 16 that fits snugly inside the intermediate-diameter portion 3" in direct contact therewith. This washer 14 is otherwise encapsulated in an elastomer forming an inner seal 15 bearing radially inward against the outer surface of the rod 9 and urged into snug contact therewith by an annular coil spring 19. In addition this elastomeric coating forms a seal lip 17 engaging radially inward against the outer surface of the portion 3", and a welt 18 that is received snugly under a bent-over lip 2' of the upper end 2" of the outer tube 2. The upper portion of this elastomeric coating forms a stripper lip 15' extending upward and radially inwardly engaging the rod 9 to clean foreign matter therefrom as the rod 9 moves down into the the tubes 2 and 3.

The funnel-shaped upper end region 3", 3''' forms an annular lubrication pocket 20 for the seal 16. To this end a bleed funnel 21 is fitted into the regions 3" and 3''' and has an upper edge 21' that is above the seal 15 so that when the funnel 20 is filled with liquid this seal 15 is fully immersed therein. Bypass grooves or passages 22 are formed between the outer surface of this funnel 21 and the confronting inner surface of the inner tube 3, these passages normally being formed as grooves in the one surface or the other, here in the funnel 21. Similarly functioning bleed grooves 14' and 14" are formed in the washer 14 to permit air bleeding up and over the end of the tube 3, although these grooves could similarly be formed in the tube end. The seal 17 is of the gland type that only seals in one direction, here preventing flow from the head 6 in the upper part of the chamber 4 into the upper end of the compartment 26.

The small-diameter portion 3' of the tube 3 is provided directly below the funnel 21 with a rod-guide ring 23. Spaced below this ring is yet another such ring 25, with the two rings 23 and 25 flanking a tight high-pressure seal, for instance of polytetrafluorethylene, which can move limited axially between the guide rings 23 and 25. The outer edge of the seal 24 as well as of the upper guide ring 23' are formed with respedtive axially throughgoing grooves 24' and 23'. The lower guide ring 24 is a relatively loose fit on the piston rod 9.

Thus gas trapped in the compartment 26 for whatever reason can leak up between the ring 25 and the rod 9, then between the tube portion 3' and the seal 24 and guide 23, then along the passages 22 and finally through the grooves 14' and 14" and past the seal 17 into the head 6. This flow path is relatively long and of small flow cross section so that, although it suffices to bleed off gas collecting in the top of the compartment 26, it does not detrimentally affect operation of the device. Furthermore since the flow is wholly past rather than through the liquid-filled funnel 20 the seal 15 is kept lubricated, even though it is well above the liquid level 5.

Figure 3:
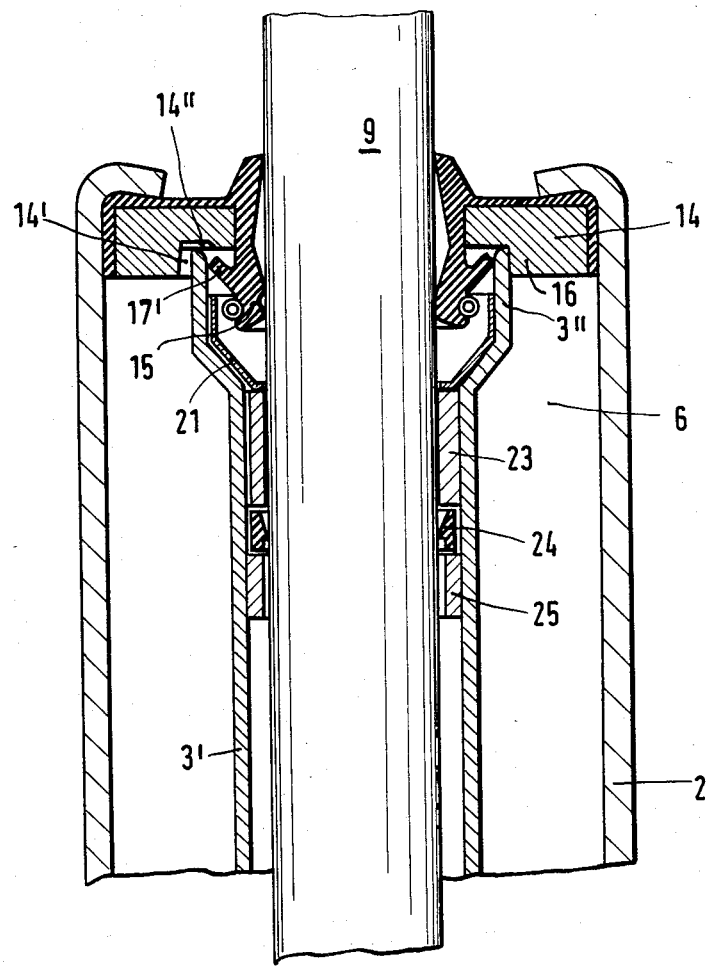
FIG. 3 is a view like FIG. 2 of another arrangement according to this invention.

The arrangement of FIG. 3 is similar, except that here the ring 14 engages radially inward around the upper end of the tube 3, and the lip 17' is formed on the inside of the end region 3", engaging outward thereagainst. This lip 17' is also constructed to allow flow only out of the compartment 26, that is to allow the microscopic leakage of gas and air that makes its way past the seal 24 therefrom.

With this system, therefore, the washer 14 with its vulcanized covering serves the following functions:
centering the tube 3 in the tube 2,
sealing the upper end of the outer chamber 4,
sealing the compartment 26 with respect to the piston rod 9, and
controlled bleeding of gas from the compartment 26 to the chamber 4 with no reverse flow.

In addition the cup 20 ensures that the inner seal 15 is continuously lubricated, even though it is provided above the liquid level 5, while any gas in the inner tube 3 is kept away from this seal 15.

We claim:
1. A hydropneumatic shock absorber comprising:
an outer tube having upper and lower ends and centered on an upright axis;
an inner tube inside the outer tube, forming therewith an outer gas/liquid chamber, having upper and lower ends, and itself internally forming an inner chamber;
a piston rod inside the inner tube in the inner chamber and generally coaxial with the tubes;
a body of liquid filling the inner chamber and partially filling the outer chamber;
a piston carried in the inner chamber on the rod, radially outwardly engaging the inner tube, and subdividing the inner chamber into an upper and a lower compartment;
a foot valve at the lower ends between the lower compartment and outer chamber and permitting limited liquid flow therebetween;
a rigid centering washer having an outer periphery engaged against the upper end of the outer tube and an axially extending ridge engaged directly radially against the upper end of the inner tube;
a flexible annular outer lip on the washer, engaged radially against the upper end of the inner tube, and bearing flexibly thereagainst in a direction opposite the direction in which pressure in the upper compartment is effective against the outer lip, whereby the outer lip permits limited fluid flow from the upper compartment to the outer chamber but blocks opposite flow;
a flexible annular inner seal underneath the ridge on the washer and engaged radially inwardly against the piston rod, whereby the washer and inner seal upwardly close off the inner chamber;
an outer seal on the washer engaged against the outer tube, whereby the washer and outer seal upwardly close off the outer chamber;
an element forming in the inner chamber an upwardly open pocket down into which the inner seal projects; and
structure forming a passage from the inner chamber axially past the pocket, whereby gas collecting in the inner chamber below the pocket can bleed up past the pocket and then pass by the lip into the outer chamber.

2. The dual-tube shock absorber defined in claim 1 wherein the washer is of L-section and has an elastomeric coating forming the seals and lip.

3. The dual-tube shock absorber defined in claim 2 wherein the washer and ridge are formed with at least one groove forming part of the bleed passage.

4. The dual-tube shock absorber defined in claim 1 wherein the ridge lies inside the upper end of the inner tube and radially outwardly engages same.

5. The dual-tube shock absorber defined in claim 1 wherein the ridge lies outside the upper end of the inner tube and radially inwardly engages same.

6. The dual-tube shock absorber defined in claim 1 wherein the upper end of the inner tube has a widened uppermost region and the element is a funnel lining forming the pocket and defining with the widened uppermost end a part of the passage.

7. The dual-tube shock absorber defined in claim 6 wherein the funnel lining has an upper edge projecting axially above the inner seal.

8. The dual-tube shock absorber defined in claim 1 wherein the inner tube is provided below the washer, lip, seals, and pocket with
a rigid piston guide ring snugly engaging the piston rod and inner tube and having an outer surface formed with an axial groove constituting part of the passage; and
a high-pressure rod seal snugly engaging the piston rod and inner tube beneath the guide ring and having an outer surface formed with an axial groove constituting part of the passage.

9. The dual-tube shock absorber defined in claim 8, further comprising
a lower retaining ring snugly fitted in the inner tube immediately below the rod seal and slightly axially spaced below same, whereby the rod seal has limited axial play between the guide and retaining rings.

10. The dual-tube shock absorber defined in claim 1 wherein the washer has an elastomeric coating forming the seals and outer lip, the inner seal being formed as an inner lip bearing flexibly and radially inwardly against the piston rod and extending axially down from the washer.

11. The dual-tube shock absorber defined in claim 10, further comprising
a spring looped around the inner lip and urging same against the piston rod.

* * * * *